United States Patent
Kauppila et al.

(10) Patent No.: US 7,153,086 B2
(45) Date of Patent: Dec. 26, 2006

(54) HIGH SPEED TURNOVER APPARATUS AND METHOD

(76) Inventors: Richard W. Kauppila, 158 S. Basin Dr., Negaunee, MI (US) 49866; Daniel L. Hintsala, 131 S. Basin Dr., Negaunee, MI (US) 49866

( * ) Notice: Subject to any disclaimer, the term of this patent is extended or adjusted under 35 U.S.C. 154(b) by 239 days.

(21) Appl. No.: 10/728,183

(22) Filed: Dec. 4, 2003

(65) Prior Publication Data

US 2005/0135917 A1   Jun. 23, 2005

Related U.S. Application Data

(60) Provisional application No. 60/430,767, filed on Dec. 3, 2002.

(51) Int. Cl.
*B21B 39/22* (2006.01)
*B65G 47/244* (2006.01)
*B65G 47/252* (2006.01)

(52) U.S. Cl. .................. 414/758; 198/402; 414/816; 414/774

(58) Field of Classification Search ........ 414/757–760, 414/768, 770, 774, 778, 782, 816; 198/402–404, 198/411, 415
See application file for complete search history.

(56) References Cited

U.S. PATENT DOCUMENTS

| | | | | |
|---|---|---|---|---|
| 1,327,315 A | * | 1/1920 | Davies | 414/754 |
| 1,466,547 A | * | 8/1923 | Leon | 198/629 |
| 2,534,221 A | * | 12/1950 | Borkmann | 198/402 |
| 2,940,612 A | | 6/1960 | Shimeld | |
| 3,306,427 A | * | 2/1967 | Spencer | 198/404 |
| 3,360,103 A | * | 12/1967 | Johnson | 198/402 |
| 3,426,882 A | * | 2/1969 | North | 198/404 |
| 3,759,384 A | * | 9/1973 | Holmberg et al. | 198/413 |
| 3,887,066 A | * | 6/1975 | Houtsager | 198/403 |
| 4,022,314 A | * | 5/1977 | Cornell | 198/413 |
| 4,471,865 A | * | 9/1984 | Johnson | 198/408 |
| 4,484,675 A | * | 11/1984 | Doherty et al. | 198/413 |
| 4,822,967 A | * | 4/1989 | Kumagami et al. | 219/752 |
| 5,143,197 A | * | 9/1992 | Sauer | 198/409 |
| 5,341,910 A | * | 8/1994 | Sauer | 198/403 |
| 5,482,140 A | * | 1/1996 | Moore | 198/403 |
| 5,605,216 A | * | 2/1997 | Raybon et al. | 198/395 |
| 5,685,410 A | * | 11/1997 | Ritola et al. | 198/457.06 |

(Continued)

FOREIGN PATENT DOCUMENTS

CA   2426303 A1 * 10/2004

(Continued)

*Primary Examiner*—Gene O. Crawford
*Assistant Examiner*—Charles Greenhut
(74) *Attorney, Agent, or Firm*—John R. Benefiel

(57) ABSTRACT

A turnover apparatus and method for inverting articles such as lumber or board pieces being conveyed sideways on two or more conveyor chain loops in which each article is advanced on the conveyor chain loops by speed up belts engaging the underside of the articles to force a leading side against a pair of lugs mounted on a respective conveyor chain loop, the article thereafter flipped up to an on edge position by flipper arms also mounted on the conveyor chain loops which each engage an adjustable cam ramp at a turnover station, the article thereafter tipped over backward by being driven by the speed belts against an elevated overhung trailing edge on the lugs to complete the turnover. Optional pivoted let down elements may be arranged to engage the trailing side of the articles to controllably lower the same by motion induced by a second cam ramp at the turnover station.

19 Claims, 6 Drawing Sheets

U.S. PATENT DOCUMENTS

| | | | |
|---|---|---|---|
| 6,216,846 B1 * | 4/2001 | Gunnarsson | 198/413 |
| 6,446,785 B1 * | 9/2002 | Tremblay | 198/404 |
| 6,769,529 B1 * | 8/2004 | Fournier et al. | 198/403 |
| 2004/0050658 A1 * | 3/2004 | Johansson | 198/377.03 |
| 2004/0200694 A1 * | 10/2004 | Henderson et al. | 198/411 |
| 2005/0135917 A1 * | 6/2005 | Kauppila et al. | 414/758 |
| 2005/0150743 A1 * | 7/2005 | Henderson | 198/403 |

FOREIGN PATENT DOCUMENTS

DE      3546087 A1 *   6/1987

* cited by examiner

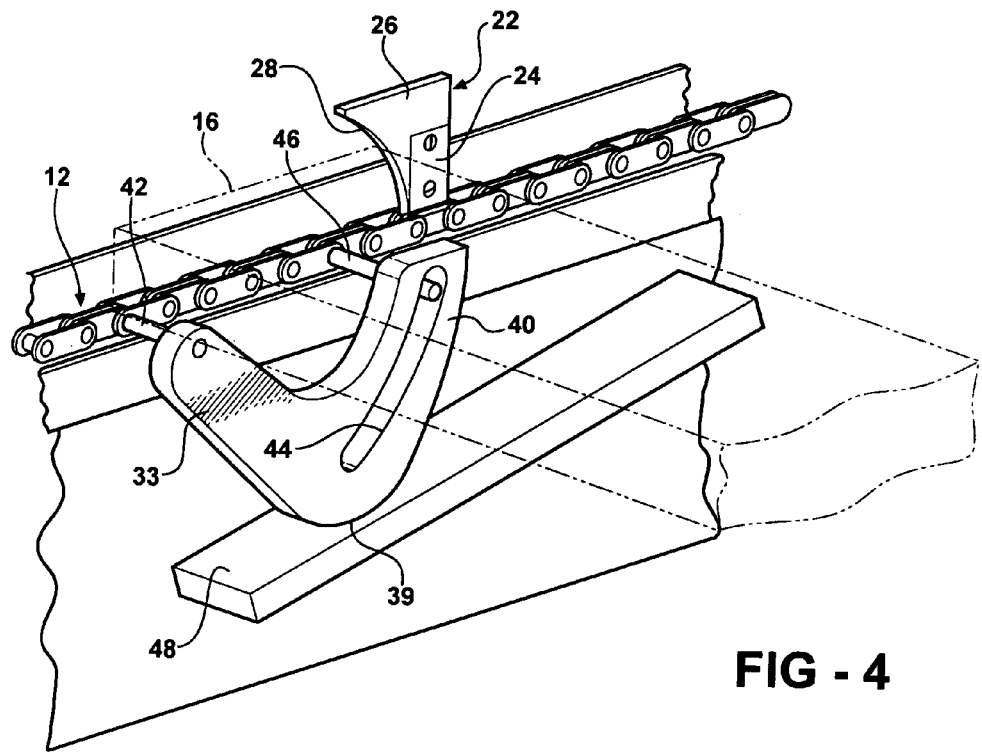
FIG - 4
FIG - 5
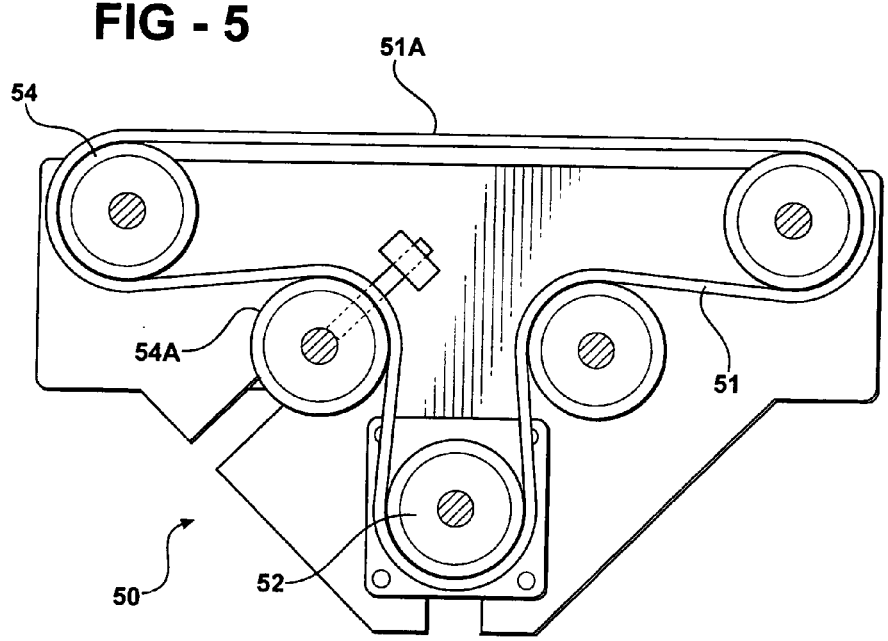

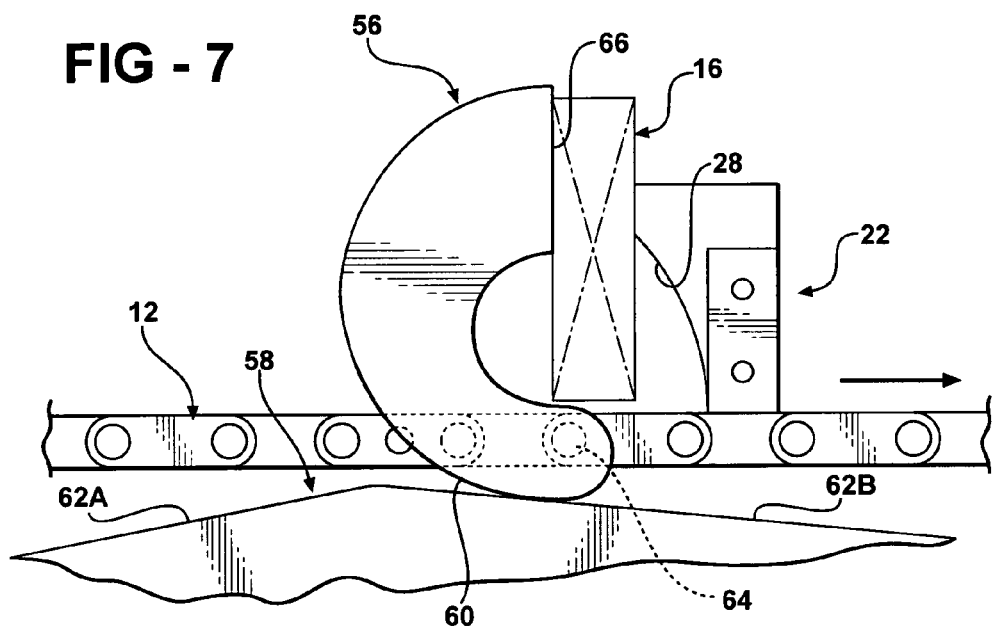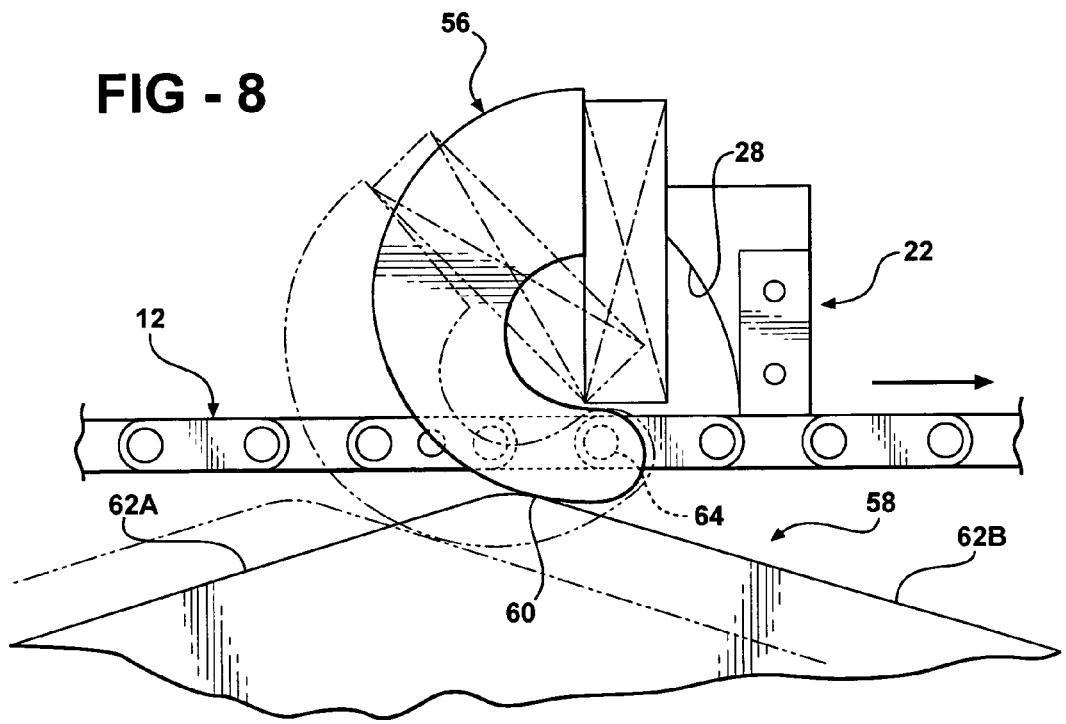

HIGH SPEED TURNOVER APPARATUS AND METHOD

CROSS REFERENCE TO RELATED APPLICATIONS

This application claims the benefit of U.S. provisional Ser. No. 60/430,767, filed Dec. 3, 2002.

BACKGROUND OF THE INVENTION

This invention concerns apparatus for turning over articles as they are being conveyed past a station. This may be done in order that an inspector is able to observe a reverse side of the article, as for example, board and lumber pieces conveyed sideways past a grader. Other conveyed articles such as doors, panels, etc., may need to be inverted for assembly or processing steps.

For many years, human lumber grade sorters stood at inspection stations next to a board conveyor and manually turned over the pieces passing by the station.

This manual operation was practical at the low speeds at which earlier conveyors operated, i.e., 40–50 pieces per minute.

Subsequently, conveyors have been speeded up to 100 or more pieces per minute. At these rates, a turnover apparatus is necessitated in order that human inspectors can carry out the grading tasks without undue physical stress.

Such apparatus has heretofore been developed which have been able to operate successfully with up to 100 pieces per minute.

See U.S. Pat. No. 6,446,785 B1 for an example of a currently available board turnover apparatus.

Even higher conveyor rates have now been achieved, i.e., 200 boards per minute or more, and a turnover apparatus and method capable of reliably achieving such rates has not heretofore been developed. This is believed to be because of the difficulties encountered in reliably synchronizing the turnover action of separately driven flipping mechanisms with the conveyor movement at these higher rates.

It is the object of the present invention to provide a turnover apparatus and method of the type described which is capable of reliably turning over conveyed articles such as boards at a rate substantially in excess of 100 articles per minute.

SUMMARY OF THE INVENTION

The above object as well as other objects which will be understood upon a reading of the following specification and claims are achieved by conveyor carried components which act on the articles to achieve turnover as the article is being conveyed. Speed up belts engage the underside of the conveyed articles such as boards or lumber pieces to be pushed ahead on the conveyor to be abutted against an upwardly projecting pair of lugs, each lug affixed to a respective one of two (or more) conveyor chain loops at spaced locations there along. Articles are initially loaded onto the conveyor chain loops into the space behind each lug set. The lugs each have a rear facing undercut surface creating a rearward facing overhung edge spaced above the conveyor chain loops.

The conveyor chain loops also each have a series of angled flipper arms, each pivotally mounted thereto at one end to the conveyor chain at a location behind a respective lug set. A downwardly protruding cam surface on each flipper arm is aligned with a respective adjustable angle cam ramp located at a turnover station, so as to be engaged as each flipper arm is carried into the station by the conveyor chain loop movement. Each flipper arm has an upwardly angled segment which is driven up to engage the leading side of a conveyed article located behind a respective lug set by a camming action created by engagement with the adjustable angle cam ramp.

This causes the conveyed article to be elevated to an on edge condition behind the lugs. The speed up belts continues to drive the bottom of the article towards the lugs so that engagement with the overhung edge tips the top of the conveyed article to the rear, which then falls over, completing the turnover of the conveyed article. Since the flipper arms and lugs are carried on the conveyor chain loops, this eliminates any problems associated with improper synchronization of the engagement therewith at high conveyor speeds.

Optional let down elements may also be pivotally mounted to each conveyor chain loop at the location on the conveyor chain loop out on the opposite side thereof, which are cammed up by engagement with an entrance segment of a second cam ramp to engage the upper side of the on edge article and are controllably lowered by motion allowed by a downwardly sloped exit segment of the second cam ramp, to control the downward dropping movement of the article over being tipped over.

DESCRIPTION OF THE DRAWINGS

FIG. 4 is a pictorial view of some of the components and conveyor portions shown in FIG. 2, with a conveyed board piece shown in phantom lines.

FIG. 5 is a diagram of the speed up belt drive incorporated in the apparatus of FIG. 1 showing the drive and recirculation thereof.

FIG. 7 is a side elevational view of a conveyor chain loop having an optional let down element mounted thereon, and a second cam ramp positioned to be engaged by a portion of the let down element when advanced past the same by circulation of the conveyor loops.

FIG. 8 is a side elevational view of the optional components shown in FIG. 7, with the let down element depicted therein shown in two different positions.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
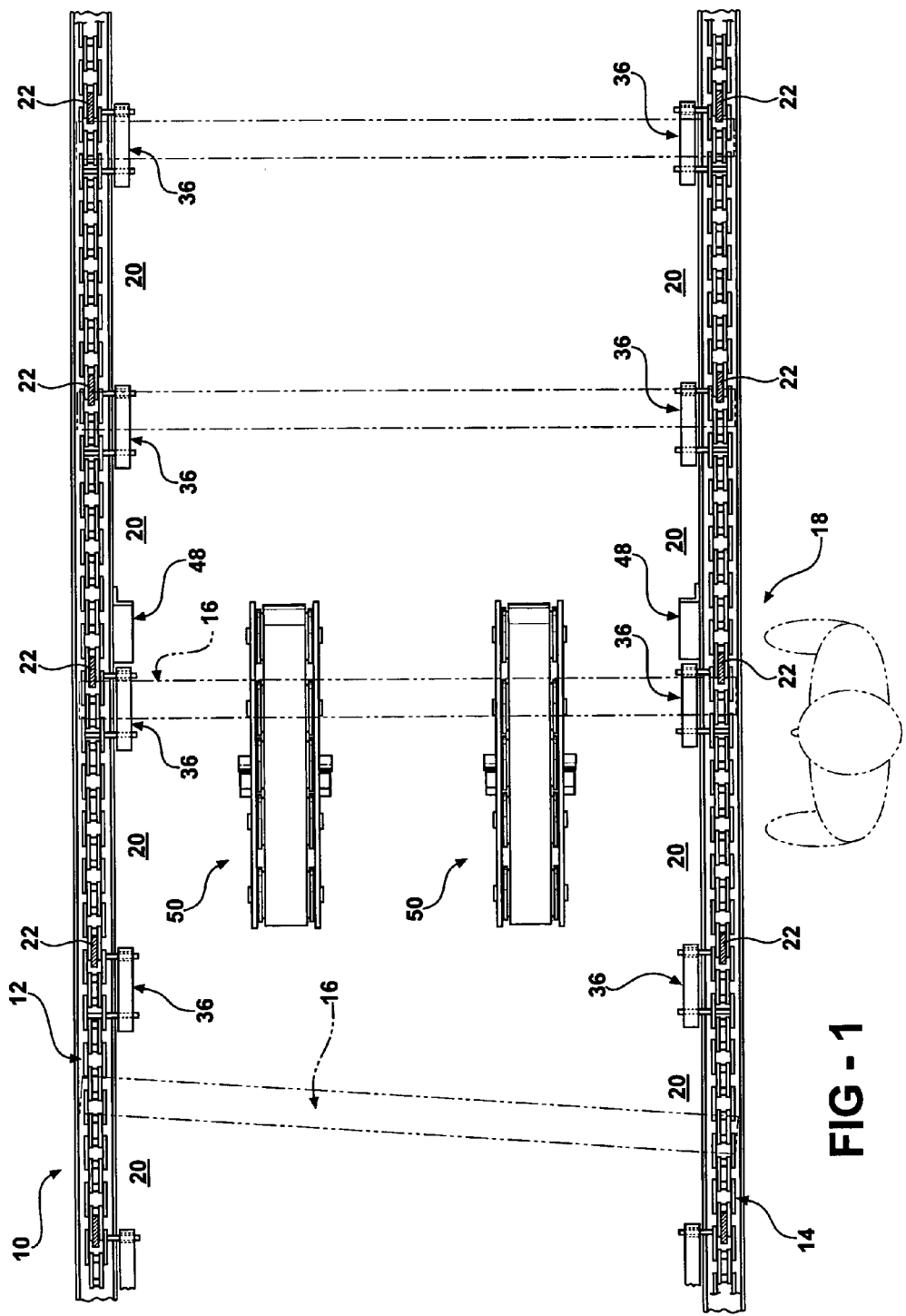
FIG. 1 is a plan view of a conveyor incorporating the turnover apparatus according to the present invention, depicting conveyed board pieces and a human grader in phantom lines.

Referring to the drawings, FIG. 1 is an overhead view of a conveyor 10 including two recirculating conveyor chain loops 12, 14 advancing articles shown as pieces 16 of lumber or boards extending across the upper surface of the chain loops 12, 14 loaded into spaces 20 between a series of lugs 22 connected to the conveyor loops 12, 14. The pieces 16 are frictionally engaged by the conveyor chain loops 12, 14 and thereby advanced sideways to a turnover station 18 where a human grader may be in a position as indicated. The apparatus is usable in various other applications such as assembly operations and with other conveyed articles, such as doors, windows, fish crates, etc.

Each piece 16 is initially loaded onto the conveyor chain loops 12, 14 disposed within the aligned spaces 20 defined between a series of spaced apart lugs 22 affixed to each conveyor chain loop 12, 14.

Each lug 22 is constructed with a pair of metal plates 24 attached to a chain link with a guide piece 26 (made of UHMW plastic, for example) sandwiched between the plates 24 extending well above the top of the associated chain conveyor loop 12, 14 and having a curved engagement surface 28 facing rearwardly towards the direction from which each chain conveyor loop 12, 14 is advancing. This creates an overhung trailing edge beneath which the piece 16 can normally fit in abutting the lugs 22 when lying flat on the conveyor.

Figure 2:
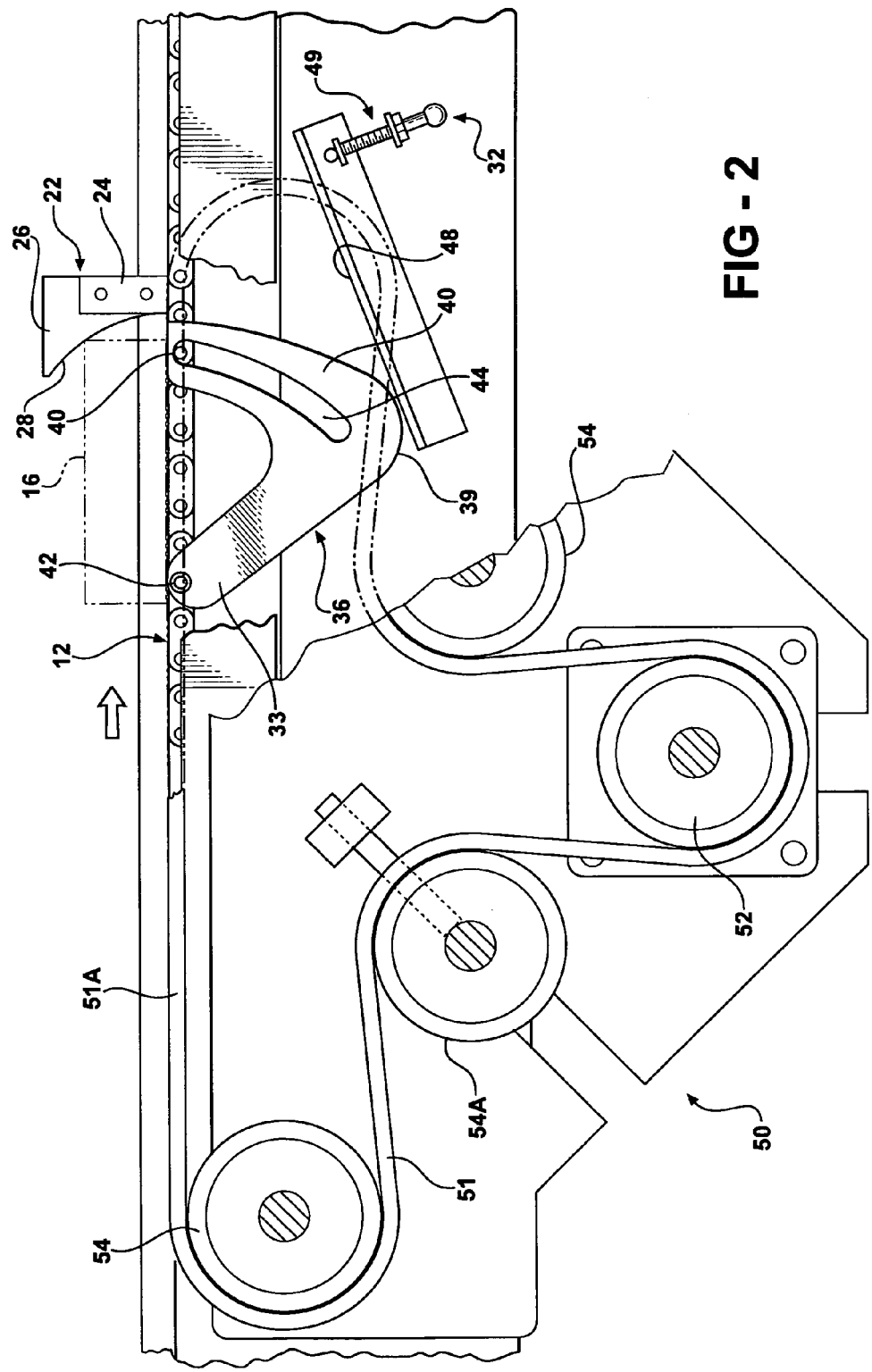
FIG. 2 is an enlarged fragmentary view in elevation of a portion of one side of the conveyor showing the components of the turnover apparatus according to the present invention.
Figure 3:
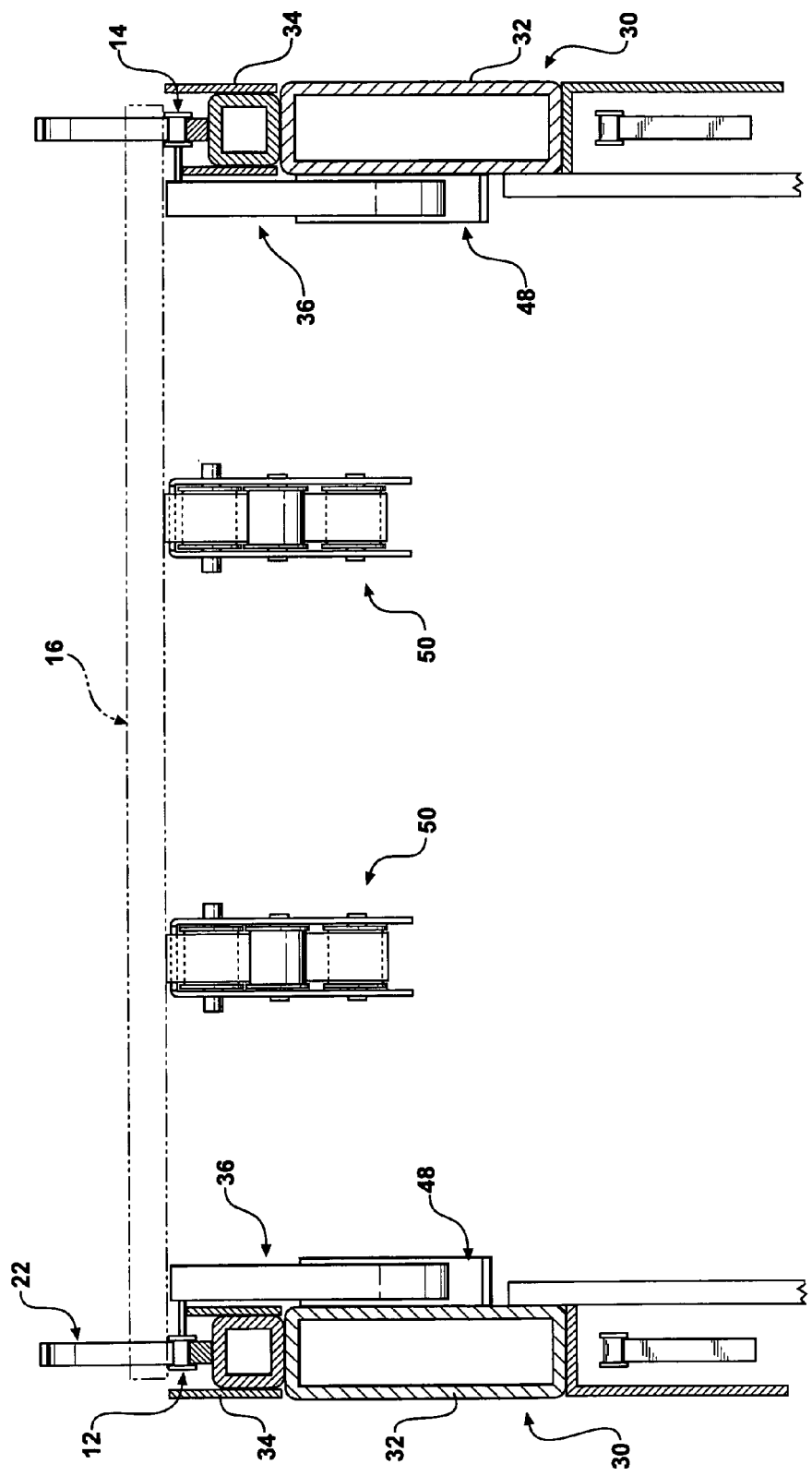
FIG. 3 is a partially sectional end view of the conveyor of FIG. 1 incorporating the turnover apparatus according to the invention.

Also mounted to conveyor chain loop 12, 14 is a series of spaced apart flipper elements, here comprised of flipper arms 36, each aligned with a respective flipper arm 36 on the opposite chain loop 12, 14 and each located just to the rear of an associated lug 22. Each flipper arm 36 (constructed of UHMW plastic, for example) has a first segment 38 which normally is inclined downwardly (FIG. 2) connected to a second segment 40 extending upwardly at an angle therefrom. This forms a knee 39 at a lowermost point of each flipper arm 36 which functions as a cam engaging surface used for a purpose as will be described below.

The first segment 38 is pivotally mounted by a link pin 42 that is fastened to a conveyor chain loop 12, 14, having a projecting end received in a pivot hole in the upper end of the first segment 36.

A guide slot 44 in the second segment 40 is engaged by a guide pin extension 46 of a second chain link pin (FIG. 4).

An angled cam ramp 48 is adjustably mounted to each frame side member 32 at the turnover station 18 aligned with the flipper arms 36 so as to engage the same, causing each set of flipper arms 36 to simultaneously pivot the same about a respective pin 42 causing the tip of the second segment 40 to swing up and engage the leading side of a board or lumber piece 16 to raise the same. The cam ramp 48 is preferably pivoted at one end to allow adjustable positioning of its slope by manipulation of a threaded rod 49 to achieve a proper camming action for a particular article and conveyor speed.

A pair of speed up belt assemblies 50 are located within the chain conveyor loops 12, 14 at the turnover station 18, each of which having an endless drive belt 51 which has a straight segment 51A parallel to the conveyor chain loops 12, 14 but which are slightly elevated (approximately one half inch) so as to engage the underside of the boards or lumber pieces 16 disposed on the chain conveyors. The speed up drive belts 51 are driven by a motor 52 or other means so as to be recirculated around idlers 54 and along a straight path parallel to the chain conveyors 12, 14. Idler 54A is mounted to a tension adjuster mechanism 56 (FIG. 5).

The belts 51 are driven at a slightly faster speed than the conveyor chain loops 12, to slide the pieces 16 forward on the conveyors chain loops 12, 14, the use of two drive belts 51 insuring that the pieces 16 are moved evenly. Operation of the speed up belts 51 causes the pieces 16 to be advanced on the conveyor chain loops 12, 14 until the leading edge thereof abuts a lower rear surface of a set of lugs 22, as shown in FIG. 6A prior to activation of the flipper arms 36.

Figure 6C:
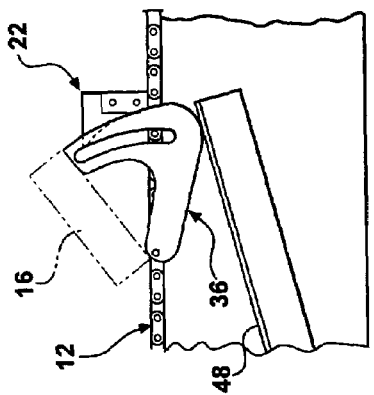
FIG. 6A–6F are views of turnover apparatus components in successive positions as a board piece turnover is executed by the apparatus.
Figure 6B:
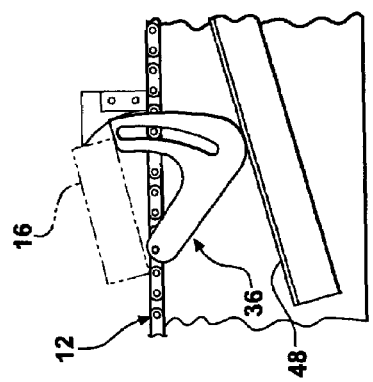
Figure 6A:
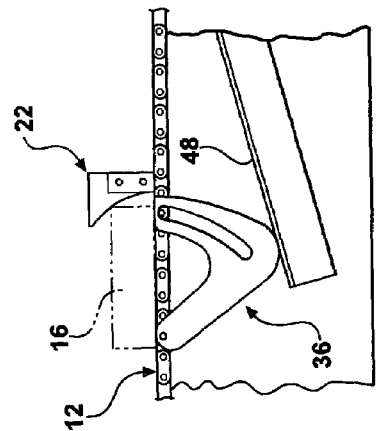

FIGS. 6B and 6C show the flipper arms 36 raising the leading edge of the piece 16. The curved lug surface 28 guides the leading edge of the piece 16 up and rearwardly.

Figure 6F:
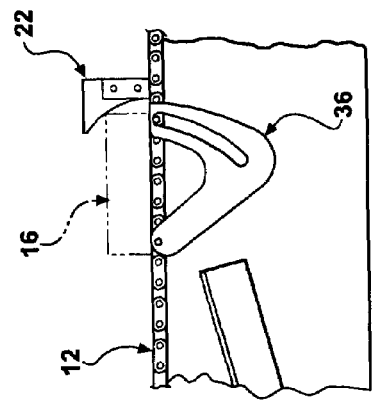
Figure 6E:
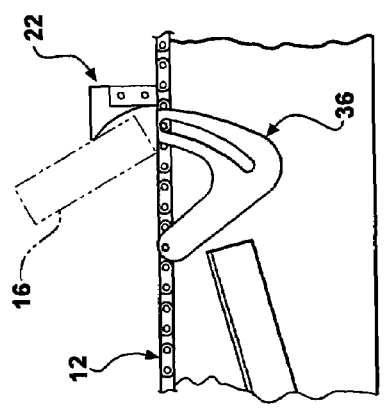
Figure 6D:
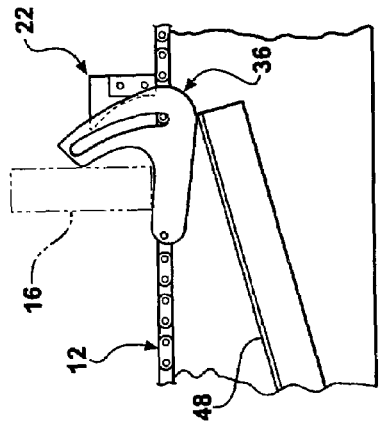

This motion presents the trailing edge of the piece 16 to the speed up belts 51 which drive the piece 16 up quickly to an on edge position seen in FIG. 6D and thereafter drive the lower edge forward so that the upper side of the piece 16 contacts the overhung trailing rear edge of the lug part 24, seen in FIG. 6E. Further advance causes the piece 16 to be tipped over as seen in FIG. 6F to the inverted or turnover position seen in FIG. 6F.

As seen in FIG. 6E and 6F, the flipper arms 36 drop back down after passing the cam 48 to retract the tip of the second segments 40 below the top surfaces of the conveyor chain loops 12.

This method and apparatus has reliably achieved rates of 200 boards per minute due to the perfect synchronism provided by the conveyor loops carried lugs and flipper arms.

Various numbers of conveyor chain loops and grading stations for example can be provided in a given installation as is well known to those skilled in the art.

The various components can be of various sizes to be matched to the size of the articles conveyed, with an adjustment of the cam ramp also enabling accommodation of the apparatus to different size articles.

Another option particularly useful for larger sized articles such as doors, windows, etc., to prevent damage when the article is flipped over, is the addition of sets of curved let down elements 56, each pivoted to one of the conveyor chain loops 12, 14 on the opposite side from the swing up flipper arms 36 (not shown in FIGS. 7 and 8). A representative let down element 56 is shown in FIGS. 7 and 8.

A second double sloped cam ramp 58 is mounted to the conveyor frame positioned to engage the lower surface 60 of the let down element 56 as the conveyor chain loops 12, 14 advance the elements 56 past the secondary cam ramps 58.

The secondary cam ramps 58 includes an upwardly inclined entry surface segment 62A and a downwardly inclined trailing surface segment 62B. The let down element 56 has a curved "reverse comma" shape which is thicker at the top to engage larger sized articles. The let down element 56 are gravity biased, tending to swing counterclockwise about a chain pivot 64 as viewed in FIGS. 7 and 8.

Contact with the entry segment cam surface 62A causes the let down elements 56 to swing up so that the upper end 66 engages the side of a piece 16 which has been driven up to an on edge position as described above.

As the lower side of piece 16 is advanced by the speed up belts 51 to be tipped over, the surface 60 reaches the exit segment of surface 62B and the let down element begins to be allowed to pivot down under the weight of the tipped piece 16 but at a rate constrained by the slope of the exit ramp 62B. This prevents too rapid dropping of the piece 16, avoiding any resultant damage to the piece 16 or conveyor parts which could otherwise occur.

The invention claimed is:

1. A turnover apparatus for turning over articles conveyed sideways on one or more recirculating conveyor loops by frictional engagement therewith, comprising:

a series of spaced apart lugs attached along each of said conveyor loops and projecting above an upper surface of said conveyor loops to be able to be engaged by articles being advanced on said upper surface of said conveyor loops;

one or more speed-up belts located adjacent to a turnover station located along said conveyor loops, said speed-up belts positioned and driven so as to frictionally engage said articles on said conveyor loops and advance said articles into contact with a next ahead lug attached to said conveyor loops;

a series of flipper arms pivotally mounted to at least one of said one or more conveyor loops to be carried along with said recirculating conveyor loops, said flipper arms pivotably mounted at a pivot point adjacent a respective associated lug so that said pivot point has a fixed relative position with respect to said associated lug, said flipper arms each having a one portion able to engage and lift a portion of an article after being driven against an associated lug by said speed up belts when said flipper arm portion is pivoted up from a normally retracted position below said conveyor loop surface;

a stationary cam ramp adjacent to each conveyor loop having said series of flipper arms mounted thereto and located at said turnover station to be positioned to engage another portion of each flipper arm as said conveyor loops carry each flipper arm past said stationary cam ramp to cause said one portion of each of said flipper arms to be successively pivoted up into engagement with an article located above said one portion to raise said article to on an edge position, each flipper arm pivoting back down to said normally retracted position after being carried past an associated cam ramp.

2. The apparatus according to claim 1 wherein said lugs each have a trailing upper edge located to the rear of a said bottom part of said lug, operation of said speed-up belts driving said on edge article forward to engage said trailing edge of said lug, a lower part of said article driven past said trailing edge, tipping over said article backwards to complete said turnover.

3. The apparatus according to claim 2 wherein said lugs each have a rear facing curved shape creating said trailing edge to guide raising of said leading edge of said article.

4. The apparatus according to claim 1 wherein two spaced apart conveyor loops are included to be able to support and sideways advance said elongated articles, a series of said lugs and flipper arms mounted to each conveyor loop, each lug and flipper on one conveyor aligned with a corresponding lug and flipper arm on the other conveyor loop.

5. The apparatus according to claim 4 wherein two spaced apart side by side speed-up belts are disposed between said two chain conveyor loops.

6. The apparatus according to claim 1 wherein each of said flipper arms has a first and a second segment, each segment extending at an angle to the other segment, a free end of said first segment downwardly extending and pivotally mounted on a conveyor loop by a chain link pin extending from said conveyor loop.

7. The apparatus according to claim 6 wherein each flipper arm second segment extends upwardly to form a knee at the intersection of said first and second segments, said knee engaging said cam to cause pivoting of each flipper arm when moving past said cam ramp.

8. The apparatus according to claim 7 further including an arcuate guide slot formed in said second segment of each flipper arm and a guide pin extending from an associated chain link of an associated chain link conveyor loop into said guide slot.

9. The apparatus according to claim 1 wherein said cam ramp is adjustably mounted to selectively enable varying of the angle of a cam surface engaging said another portion of each flipper arm.

10. The apparatus according to claim 1 further including a series of let down elements pivotally mounted on each conveyor loop, each element located adjacent a respective flipper arm, and a second cam ramp engaging each of said let down elements when advancing through said turnover station to initially raise said let down element and thereafter lower the same, each let down element having a portion engaging a rear side of an article raised to an on edge position.

11. A method of turning over articles at a turnover station alongside a conveyor including one or more recirculating conveyor loops supporting and frictionally engaging said articles positioned on said conveyor loops to convey the same, including:

mounting a series of spaced apart lugs to each conveyor loop, said lugs each having a portion projecting above said conveyor loops;

loading each article into aligned spaces between successive lugs to be carried along on said conveyor loops;

pivotally mounting a series of flipper arms to at least one of said one or more conveyor loops to be carried along with said conveyor loop to which said flipper arms are pivotably mounted, said flipper arms pivotably mounted at a point adjacent a respective associated lug so that said point has a fixed position with respect to said associated lug, each flipper arm having an article engagment portion normally positioned below a rear side of each lug;

driving each article so as to be advanced on said one or more conveyor loops into abutment with a next ahead lug;

fixedly locating a cam ramp adjacent each conveyor loop having said flipper arms pivotally mounted thereto at a turnover station so as to engage one portion of each flipper arm moving into said turnover station as an article is moved through said turnover station and past said cam ramp, each adjacent conveyor loop cam ramp configured to cause an upward movement of each of said flipper arms from a normally retracted position to engage an article engagement portion of each of said flipper arms with a leading side of an article abutting a lug to elevate said leading side of said article when engaged therewith, said flipper arms each moving back to said retracted position after moving past said cam ramp.

12. The method according to claim 11 further including the steps of providing a trailing upper edge on each lug spaced above an article in abutment against said lug;

raising said article to an on edge position with said flipper arm upward movement; and thereafter advancing said on edge article against said lug trailing edge by a frictional engagement of a speed-up drive belt with a lower edge of said article to thereafter tip over said article in a rearward direction to complete the turnover at said turnover station.

13. The method according to claim 12 wherein said articles are conveyed by two or more spaced conveyor loops and an aligned series of lugs are mounted on each conveyor loop, and a pair of speed-up belts are interposed between said conveyor loops to drive a conveyed article into abutment with an adjacent lug.

14. The method according to claim 12 further including the step of engaging an upper rear portion of each article as it is tipping over from said on edge position, and controllably restraining lowering of said upper rear portion of each article to slow the rate of tipping over of each article.

15. The method according to claim 14 further including pivotally mounting a let down element to each of said one or more conveyor loops, locating each let down element adjacent a respective flipper arm and engaging said upper rear portion of an article while driving each let down element with a second cam ramp to control descent thereof as said article tips over.

16. Apparatus for flipping over articles on a loop conveyor having an upper surface frictionally engaging said articles resting thereon to convey said articles by advance of said loop conveyor, comprising a series of spaced apart lugs mounted to said loop conveyor defining intervening spaces able to receive an article to be turned over;

a series of flipper elements pivotally mounted to said loop conveyor to be carried along therewith as said loop conveyor is advanced, each flipper element located adjacent an associated lug and pivotable at a fixed relative position with respect to said associated lug to raise a first portion of each flipper element from a lowered retracted position into engagement with a leading side of an article abutting an associated lug;

a cam surface mounted at a turnover station to engage each flipper element moved past said turnover station by said loop conveyor, said cam surface causing pivoting raising motion of each flipper element from a retracted lowered position, said pivoting raising motion of each flipper element flipping up an article located adjacent a respective lug on said loop conveyor, and each flipper element again assuming said lowered retracted position upon moving past said cam surface.

17. An apparatus according to claim 16 further including a speed-up drive engaging each article to advance the same against the next ahead lug prior to entering said turnover station.

18. An apparatus according to claim 17 wherein each lug has a trailing overhung edge to engage an upper portion of said article flipped up by said flipper element, and said speed-up drive further driving the bottom of said article while having an upper portion in engagement with said overhung edge to cause tipping over of said article.

19. An apparatus according to claim 18 further including a let down element pivotally mounted on one said of said chain loop conveyor chain and adjacent each flipper element, a second cam having an entrance segment engaging and pivoting up said let down element in said turnover station to engage on upper portion of said article tipped over by said engagement with said trailing edge, said second cam surface having an exit segment engaging said let down element to allow a controlled descent of said article as said article tips over to insure a slowed rate of drop to avoid damage thereto.

\* \* \* \* \*